US006682798B1

(12) United States Patent
Kiraly

(10) Patent No.: US 6,682,798 B1
(45) Date of Patent: Jan. 27, 2004

(54) EXPANDED CONTENT DEVICE POUCH

(75) Inventor: Guy S. Kiraly, Germantown, TN (US)

(73) Assignee: CCL Label, Inc., Upland, CA (US)

(*) Notice: Subject to any disclaimer, the term of this patent is extended or adjusted under 35 U.S.C. 154(b) by 0 days.

(21) Appl. No.: 09/631,004

(22) Filed: Aug. 2, 2000

(51) Int. Cl.[7] .......................... B42D 15/00; B32B 3/00

(52) U.S. Cl. .................... 428/40.1; 428/41.7; 428/41.8; 428/42.1; 428/42.2; 428/42.3; 281/5; 283/81; 283/101

(58) Field of Search .............................. 428/40.1–42.3, 428/192, 194, 914; 283/81, 101; 281/2, 5

(56) References Cited

U.S. PATENT DOCUMENTS

| | | | | | |
|---|---|---|---|---|---|
| 4,744,161 | A | | 5/1988 | Instance | |
| 4,991,878 | A | * | 2/1991 | Cowan et al. | 283/81 |
| 5,200,243 | A | * | 4/1993 | Van Leen | 428/40 |
| 5,290,616 | A | * | 3/1994 | Cowan et al. | 428/40 |
| 5,588,239 | A | | 12/1996 | Anderson | |
| 5,766,716 | A | | 6/1998 | Barry | |
| 5,804,271 | A | * | 9/1998 | Barry | 428/40.1 |
| 5,866,219 | A | * | 2/1999 | McClure et al. | 428/40.1 |
| 5,972,455 | A | * | 10/1999 | Barry | 428/40.1 |
| 6,213,520 | B1 | * | 4/2001 | Treleaven et al. | 283/81 |
| 6,422,605 | B1 | * | 7/2002 | Lind | 283/81 |

* cited by examiner

*Primary Examiner*—Harold Pyon
*Assistant Examiner*—Brian P. Egan
(74) *Attorney, Agent, or Firm*—Warner Norcross & Judd LLP

(57) ABSTRACT

A pouch label assembly having an overlaminate sheet cleanly removable from an expanded content device to prevent destruction of the device. The pouch includes a self-adhesive base layer, a plastic overlaminate sheet disposed over the base layer to form a pouch, and an expanded content device disposed in the pouch. The expanded content device is anchored to the overlaminate sheet with an emulsion acrylic adhesive. Use of this adhesive provides clean, non-deforming removal of the expanded content device from the overlaminate sheet, and consequently the pouch. Perforations or grasping tabs may be included on the overlaminate sheet adjacent the perimeters of the expanded content device to facilitate removal of the device from the pouch.

17 Claims, 3 Drawing Sheets

EXPANDED CONTENT DEVICE POUCH

BACKGROUND OF THE INVENTION

The present invention relates to expanded content device retaining pouches that are securable to articles including packaging items such as a bottles, cans, boxes and other containers.

It is desirable to attach an expanded content device such as a booklet or a sheet of printed instructions to a product, and to avoid soiling of the booklet or sheet during handling of the product or to avoid loss of the booklet or sheet during such handling. Labels including pouches for containing expanded content devices are known. These labels typically include a base layer including an adhesive for adhering that base layer, and consequently the entire label, to a container. An expanded content device is secured to the base layer with an overlarninate sheet. The overlaminate sheet overlaps at least two edges of the expanded content device and is marginally adhered to the base layer in the regions of overlap.

These expanded content device pouches include perforations disposed adjacent the marginal overlap so that a user may tear these perforations and remove the expanded content device entirely from the base layer for viewing. After removal, the expanded content device cannot be reattached to the base layer.

Conventionally, the overlaminate sheet is permanently attached to the cover panel of the expanded content device to hold the device in a fixed position relative to the base layer. Several problems are associated with this permanent attachment of the overlaminate to the cover panel. First, if a user tries to remove the overlaminate from the cover panel of expanded content device, that panel is rendered illegible or worse, destroyed. Second, the overlaminate inhibits unfolding of the expanded content device because it makes one sheet, that is the top panel, thicker than the rest of the panels in a multi-panel expanded content device. Finally, the perforations along the edges of the remaining overlaminate attached to the cover panel are aesthetically displeasing.

SUMMARY OF THE INVENTION

The aforementioned problems are overcome by the present invention wherein a pouch label assembly includes a low-tack adhesive between the overlaminate sheet and the expanded content device to prevent destruction of the top panel when the overlaminate sheet is removed therefrom.

The label pouch includes a base layer, an overlaminate sheet removably affixed to the base layer to form a pouch, and an expanded content device disposed in the pouch. The overlaminate sheet is coated with an adhesive to prevent the expanded content device from falling out of the pouch. This adhesive forms a high-tack permanent-like bond with plastic and films, but does not bond well to materials constructed partially or completely from paper. At most, the adhesive forms a low-tack, easy-release bond with the paper material.

In use, the overlaminate sheet is torn away from the base layer to expose the expanded content device. The expanded content device may be completely removed from the overlaminate sheet by simply pulling the cover panel away from the overlaminate. Because of the low-tack characteristic of the adhesive to paper, two advantages are realized. First, images on the top panel remain legible, and second, the expanded content device may be removed completely intact from the pouch.

These and other objects, advantages and features of the invention will be more readily understood and appreciated by reference to the detailed description of the preferred embodiments and the drawings.

DETAILED DESCRIPTION OF THE PREFERRED EMBODIMENT

Figure 1:
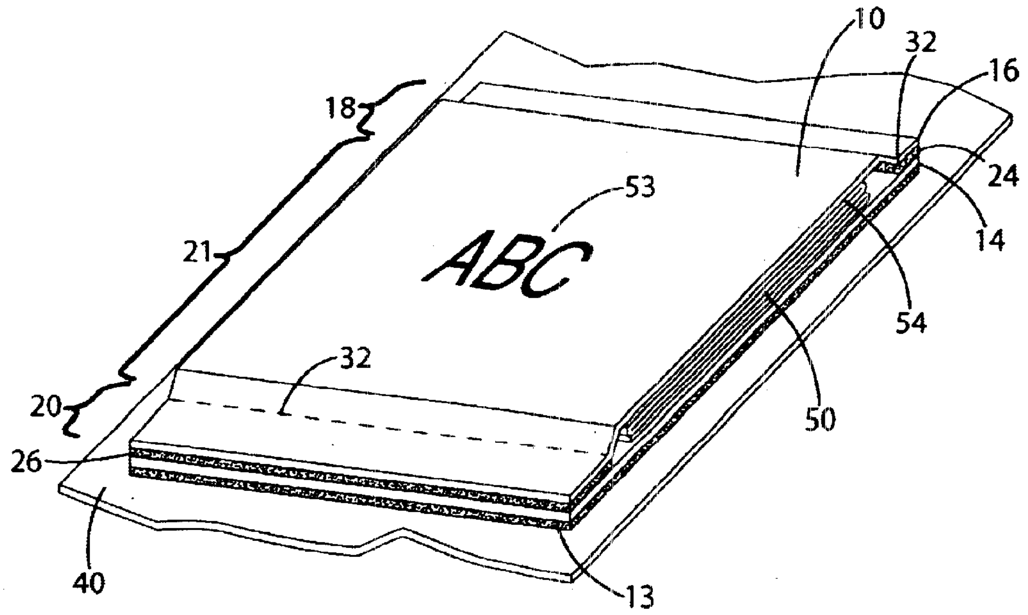
FIG. 1 is a perspective view of an expanded content device pouch of the present invention.
Figure 2:
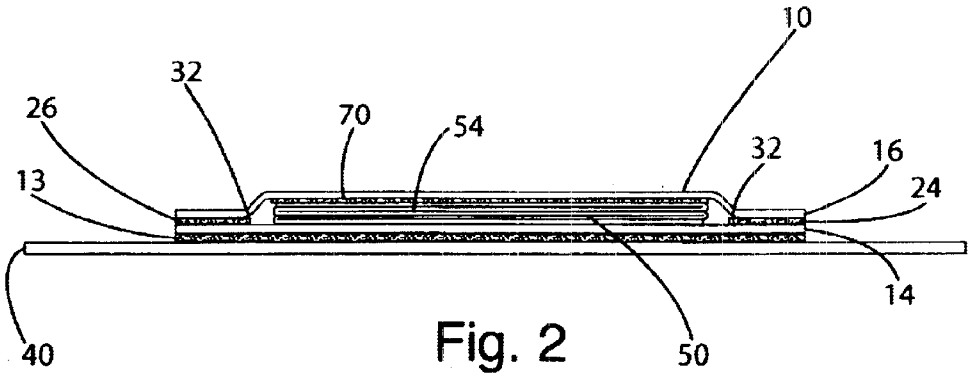
FIG. 2 is an elevation view of the expanded content device pouch.

A pouch for an expanded content device according to the preferred embodiment of the present invention is depicted in FIGS. 1 and 2 and generally designated 10. The label pouch includes a base layer 14, an overlaminate sheet 16, and an expanded content device 50 releasably adhered to the overlaminate sheet 16 with film adhesive 70.

With reference to FIGS. 1 and 2, the base layer 14 may be adhered to a release backing 40 by a layer of adhesive 13 which is applied initially to the base layer 14 by an appropriate adhesive applicator. The label pouch 10 may be peeled from the release backing 40 and attached to an article to be labeled with the layer of adhesive 13. The base layer 14 is constructed of paper material, plastic, synthetic resin, metal foil, or any other suitable material. As used herein, paper material means any material constructed partially or completely from paper and/or exhibits paper-like properties. The base layer may also include indicia 55 (FIG. 3) printed thereon.

The overlaminate 16 is attached to the base layer 14 along margins 18 and 20 by layers of adhesive 24 and 26. The overlaminate 16 is preferably made of a transparent plastic material to facilitate viewing of information 53 on the top panel 54 of the expanded content device. Alternatively, the overlaminate may be constructed of synthetic cloth, synthetic resin films, metal foils, any other suitable material that is transparent, opaque or colored as desired. Perforations 32 are adjacent the margins 18 and 20 and releasably attach the central portion 20 of the overlaminate sheet 16 to the margins. Alternatively, the central portion 20 may be coupled to the margins 18 and 20 with zipper perforations, V-notched tear lines or any other construction that facilitates detachment of the central portion from at least one of the margins.

Referring to FIGS. 1 and 2, an expanded content device 50 is disposed between the base layer 14 and overlaminate 16. The expanded content device 50 is generally rectangular and formed as a number of pages or panels. "Expanded content device" means any booklet or construct of single or multiple leaflets formed as a single page or number of pages or single panel or number of panels. The pages or panels may be printed with any indicia including text or graphics of any kind. As depicted, the pages or panels of the expanded content device 50 are stacked in overlying relationship and may be folded over like a map; however, any other desirable configuration may be used as desired. For example, expanded content devices that open like the pages of a book, or any other configuration that makes viewing of the information printed on the sheets or panels convenient may be used. The information may be printed on the sheets using offset, screen or any other suitable printing techniques.

Figure 3:
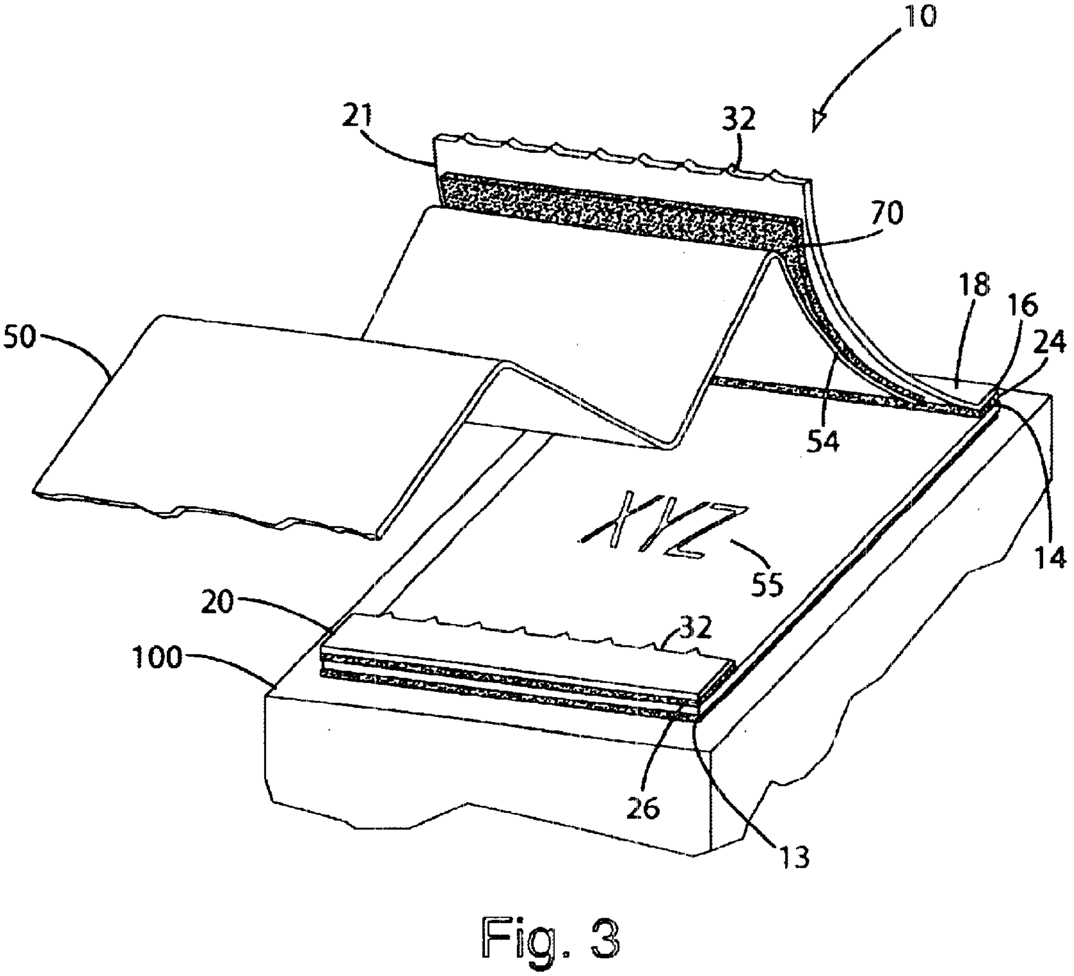
FIG. 3 is a perspective view of expanded content device partially removed from an overlaminate layer of the pouch.

As best depicted in FIGS. 2 and 3, the uppermost panel 54 of the expanded content device 50 is in contact with adhesive layer 70. The preferred film adhesive 70 of the present invention is unique; it bonds very well to plastic, but it does not bond well to paper material. In the preferred embodiment, the expanded content device is constructed from a paper material and the overlaminate is constructed from a plastic. Thus, the film adhesive adheres to the paper material top panel 54 of the expanded content device 50 to prevent it from sliding out of the pouch, but still allows the expanded content device 50 to be easily removed from the overlaminate sheet 16. Alternatively, the overlaminate may be made from a paper material and the expanded content device made from a plastic so that the two substrates separate easily from one another when bound together with the film adhesive of the present invention.

The preferred film adhesive is an emulsion acrylic available from Sunbelt Corporation of Atlanta, Ga. Any adhesive that exhibits sufficient tack to a paper material but still remains cleanly and readily removable from the paper material may be used. It is also desired that the film adhesive require a greater peel force to remove the adhesive from a plastic substrate than the peel force necessary to remove the adhesive from a paper material substrate.

Method of Use

To label an article, the label pouch 10 is stripped off from the backing 40 of the release material 40 (FIGS. 1 and 2), for example, by an automatic labeling machine. As depicted in FIG. 3, the label pouch 10 is adhered to an article 100 by adhesive 13. To open the label pouch 10 and access the expanded content device 50, a user must tear at least one of the perforations 32. The torn perforations 32 may also indicate to a user of the label assembly that the expanded content device has been tampered with.

With particular reference to FIG. 3, central region 21 of the overlaminate sheet 16 is pulled away from margin 20 along with perforations 32 to expose the expanded content device. The top panel 54 of the expanded content device 50 has been partially detached from the adhesive 70 of overlaminate sheet 16 and the top panel 54 is not destroyed or rendered illegible. The expanded content device may be completely detached from the central portion 21 of the overlaminate 16. The user may then view the expanded content device 50 and indicia 55 on the base layer 14 as conventionally known.

After the expanded content device is removed from the base layer the overlaminate sheet 16 may be re-laid over the base layer 14, or torn along the other set of perforations 32 to completely remove the central portion 21 of the overlaminate sheet from the label pouch 10.

Alternative Embodiments

Figure 4:
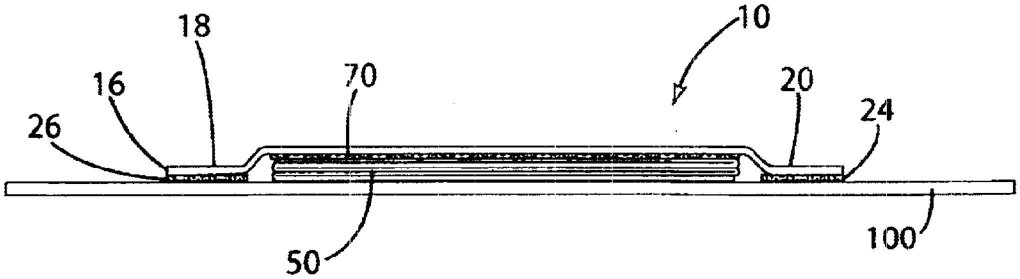
FIG. 4 is an elevation view of an alternative embodiment of the pouch.

In an alternative embodiment as depicted in FIG. 4, the label pouch 10 is formed without a base layer. The overlaminate sheet 16 is adhered along margins 18 and 20 to the article 100 to be labeled with adhesive layers 24 and 26. The expanded content device 50 is disposed under the overlaminate sheet 16 and releasably adhered thereto with the film adhesive 70 having tacking, anchoring, adhesive, and peel force properties as explained above. The central portion 21 is releasably attached to the margins 18 and 20 with perforations, or in the alternative, zipper perforations, V-notch tear lines, or any other suitable construction that facilities release of the central portion from at least one of the margins.

Figure 5:
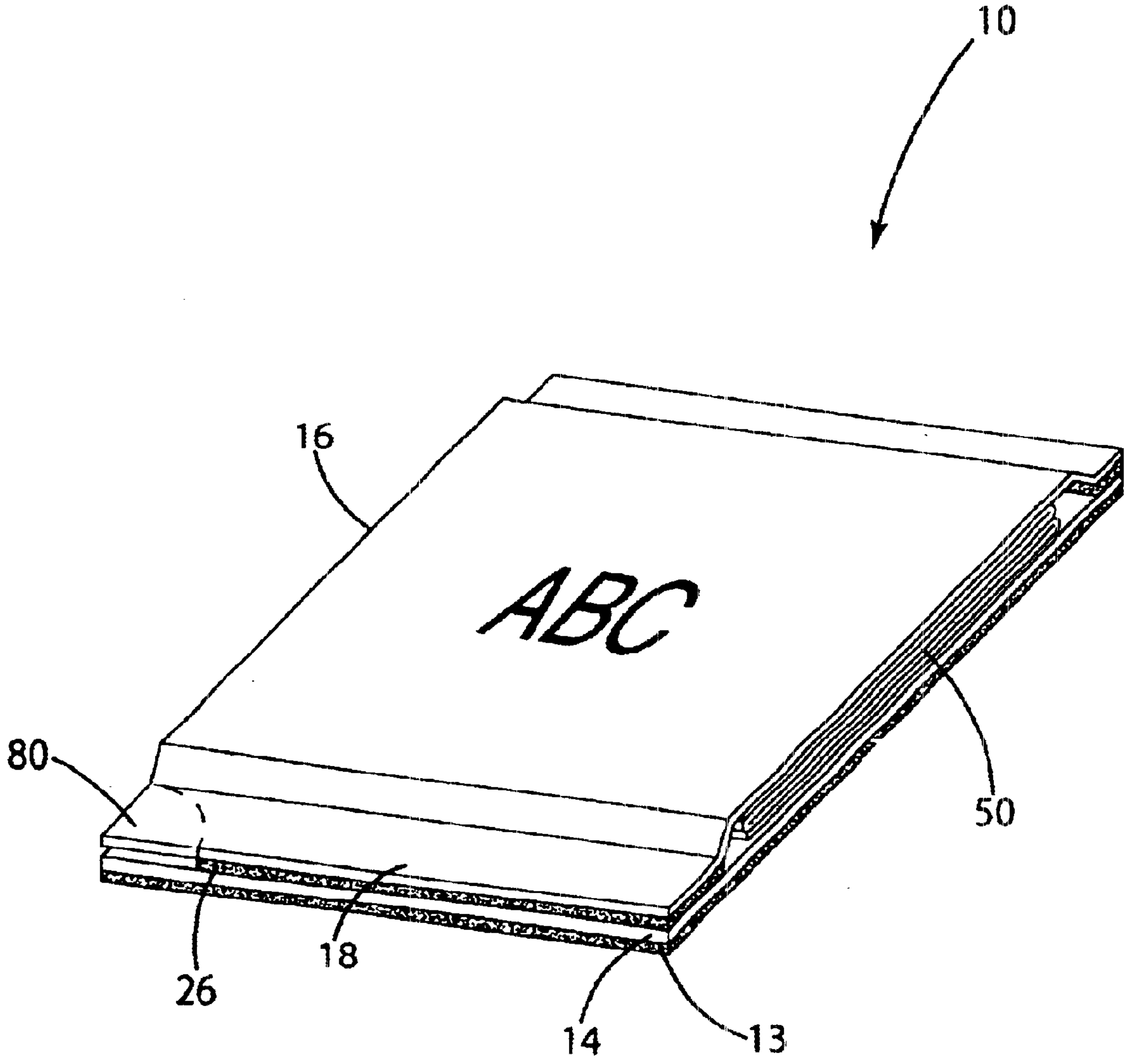
FIG. 5 is a perspective view of a second alternative embodiment of the pouch.

In a second alternative embodiment as depicted in FIG. 5, the overlaminate sheet 16 includes a pull tab 80 along margin 18. Preferably there is no adhesive 26 under the pull tab 80 to facilitate grasping of the tab. This pull tab is used in place of perforations or other similar release devices so that the overlaminate sheet 16 may be removed.

The use of the alternative embodiments is similar to that of the preferred embodiment explained above. To expose the expanded content device 50, the overlaminate sheet 16 is removed from or partially detached from the base layer or article to expose the expanded content device 50.

The above descriptions are those of the preferred embodiments of the invention. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The embodiments of the invention in which an exclusive property or privilege is claimed are defined as follows:

1. A label assembly comprising:

a base layer;

an expanded content device including a paper page, said expanded content device having indicia printed therein;

a plastic sheet overlapping and adhered to said base layer to form a pouch in which said expanded content device is disposed; and an adhesive having a first property of bonding more strongly to plastic than to paper, said adhesive uniformly disposed between said sheet and said page to retain said expanded content device in said pouch, said adhesive having a second property of being removable from said page without damaging said page so that said expanded content device is removable from said pouch without damaging said expanded content device.

2. The label assembly of claim 1 wherein said sheet includes means for initiating detachment of at least a portion of said sheet to expose said expanded content device.

3. The label assembly of claim 1 wherein said adhesive is an emulsion acrylic adhesive.

4. The label assembly of claim 1 wherein said sheet is transparent to allow viewing of said expanded content device.

5. A label pouch comprising:

an expanded content device including a plurality of pages, said pages constructed of paper material;

a plastic panel substantially covering said expanded content device; and adhesive means for releasably adhering said panel to a page of said expanded content device, and for releasing said page from said panel in a manner that prevents degradation of said page said adhesive means bonding with stronger adhesion to the plastic panel than to the paper material, wherein said adhesive means is uniformly disposed between said plastic panel and said page.

6. The label pouch of claim 5 wherein said adhesive means is an emulsion acrylic adhesive.

7. The label pouch of claim 6 further comprising a base layer, said plastic panel overlapping said expanded content device and marginally adhered to said base layer.

8. A label assembly comprising:

an expanded content device including a paper top panel, said expanded content device bounded by at least two edges;

an overlaminate panel constructed from plastic disposed adjacent said top panel and overlapping at least one of said edges; and an adhesive uniformly disposed between said top panel and said overlaminate panel, said adhesive having the property of bonding with greater adhesion to plastic than to paper, said overlaminate panel moved from an unreleased mode, wherein said adhesive anchors said overlaminate panel to said top panel, to a released mode, wherein said overlaminate is at least partially released from said top panel, said top panel substantially free from degradation in said released mode.

9. A succession of labels carried on a length of release backing material, each label comprising:

a base layer releasably adhered to the release backing;

a film adhered to said base layer to form a pouch;

an expanded content device including a top panel having indicia, said top panel constructed from paper and releasably adhered directly to said film within said pouch with an adhesive uniformly coated over said film between said film and said top panel, said adhesive having a first property of bonding more strongly to plastic than to paper and a second property of being removable from the top panel so that the expanded content device is substantially disassociated from said film without said indicia being rendered illegible.

10. The succession of labels of claim 9 wherein said film includes means for facilitating detaching said film from said base layer to expose said expanded content device.

11. The succession of labels of claim 10 wherein said film is adhered to said expanded content device with an adhesive exhibiting sufficient peel force and tack to anchor said expanded content device.

12. The succession of labels of claim 11 wherein one from said expanded content device and said film is constructed of a paper material and the other is constructed of plastic.

13. The succession of labels of claim 12 wherein said film is plastic.

14. The succession of labels of claim 13 wherein said film is transparent.

15. The succession of labels of claim 14 wherein said expanded content device is removable from said label pouch in a non-repeatable action whereby unauthorized tampering with said expanded content device is indicated.

16. The succession of labels of claim 15 wherein said detaching means includes a tab means incorporated in said film for providing a grasping surface for a user to peel said film away from said base layer.

17. The succession of labels of claim 16 wherein said adhesive is constructed from a emulsion acrylic.

* * * * *